US007667908B2

(12) United States Patent
Nagao et al.

(10) Patent No.: US 7,667,908 B2
(45) Date of Patent: Feb. 23, 2010

(54) MAGNETIC TRANSFER METHOD FOR PERPENDICULAR MAGNETIC RECORDING MEDIUM, PERPENDICULAR MAGNETIC RECORDING MEDIUM, AND MAGNETIC RECORDING APPARATUS

(75) Inventors: Makoto Nagao, Odawara (JP); Toshihide Ishioka, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 254 days.

(21) Appl. No.: 11/764,499

(22) Filed: Jun. 18, 2007

(65) Prior Publication Data
US 2007/0297078 A1 Dec. 27, 2007

(30) Foreign Application Priority Data
Jun. 27, 2006 (JP) ............................. 2006-176579

(51) Int. Cl.
*G11B 5/86* (2006.01)
(52) U.S. Cl. ........................................... 360/17
(58) Field of Classification Search ...................... None
See application file for complete search history.

(56) References Cited

U.S. PATENT DOCUMENTS

| 6,791,774 | B1 * | 9/2004 | Albrecht et al. | 360/17 |
| 6,798,590 | B2 * | 9/2004 | Albrecht et al. | 360/16 |
| 2003/0112539 | A1 | 6/2003 | Shu | |
| 2003/0184896 | A1 | 10/2003 | Ishida et al. | |
| 2006/0114599 | A1 | 6/2006 | Iwashiro et al. | |
| 2006/0132953 | A1 | 6/2006 | Asakura et al. | |

FOREIGN PATENT DOCUMENTS

| EP | 0 915 456 A1 | 5/1999 |
| EP | 1 638 085 A2 | 3/2006 |
| JP | 10-40544 A | 2/1998 |
| JP | 2001-297433 A | 10/2001 |
| JP | 2004-87099 A | 3/2004 |
| JP | 2006-155818 A | 6/2006 |
| JP | 2007-273061 A | 10/2007 |

OTHER PUBLICATIONS

EP Communication, dated Feb. 13, 2009, issued in corresponding EP Application No. 07011706.4, 6 pages.

* cited by examiner

*Primary Examiner*—Mark Blouin
(74) *Attorney, Agent, or Firm*—Sughrue Mion, PLLC

(57) ABSTRACT

The present invention provides a magnetic transfer method comprising: a magnetic transfer step of applying a magnetic field for transfer parallel to the plane of a disk shaped substrate having formed on the surface thereof a pattern composed of magnetic layer arrangement corresponding to information to be transferred to a perpendicular magnetic recording medium while a master recording medium for perpendicular magnetic transfer being the substrate is brought into close contact with the perpendicular magnetic recording medium, and thereby transferring the magnetic pattern of the master recording medium for perpendicular magnetic transfer to the perpendicular magnetic recording medium; and a servo correction information writing step of writing by use of a magnetic head, servo correction signal information into a section adjacent to the information transferred to the perpendicular magnetic recording medium by the magnetic transfer step.

12 Claims, 9 Drawing Sheets

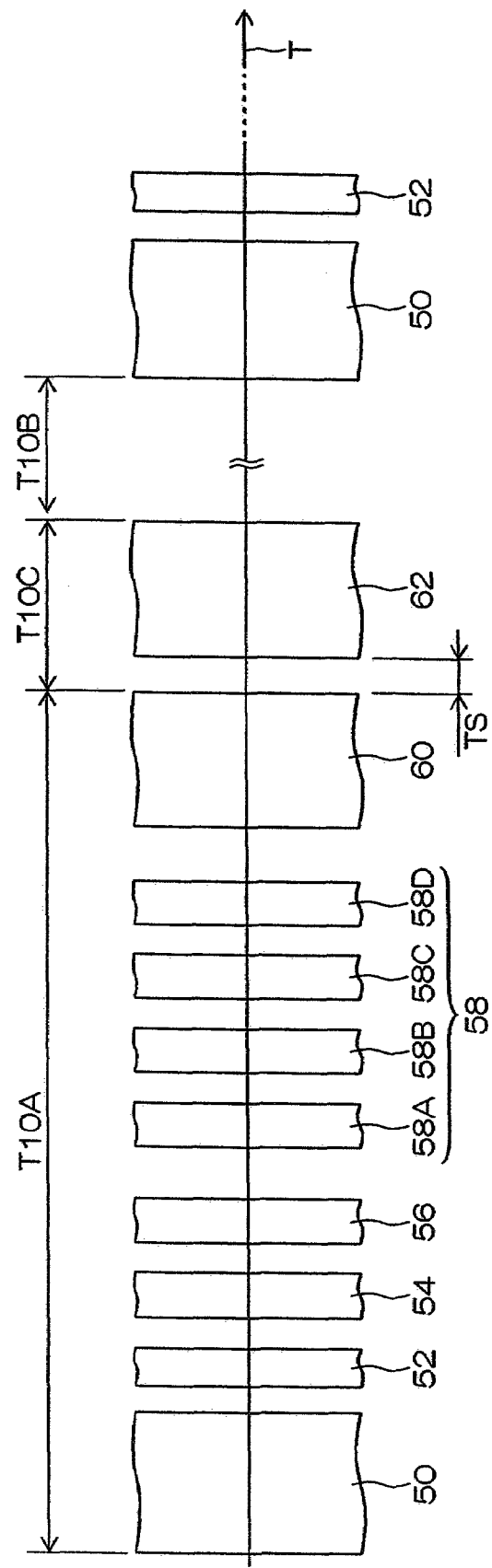

MAGNETIC TRANSFER METHOD FOR PERPENDICULAR MAGNETIC RECORDING MEDIUM, PERPENDICULAR MAGNETIC RECORDING MEDIUM, AND MAGNETIC RECORDING APPARATUS

BACKGROUND OF THE INVENTION

1. Field of the Invention

The present invention relates to a magnetic transfer method for a perpendicular magnetic recording medium, a perpendicular magnetic recording medium and a magnetic recording apparatus, and more particularly to a magnetic transfer method for a perpendicular magnetic recording medium, a perpendicular magnetic recording medium and a magnetic recording apparatus suitable for performing perpendicular magnetic transfer of a magnetic information pattern such as format information onto a magnetic disk used in a hard disk apparatus or the like.

2. Description of the Related Art

In general, in the case of a magnetic disk (hard disk) used in a hard disk drive, which has recently been rapidly spreading, after being delivered from a magnetic disk maker to a drive maker, format information, address information and the like are written thereinto as servo signals before being incorporated in a drive. This writing can be performed by use of a magnetic head, but a method of performing magnetic transfer all at once by use of a master recording medium (master disk) having written thereinto these format information and address information, is more efficient and preferable.

In this magnetic transfer technique, with a master disk and a transfer object medium (slave disk) being in close contact with each other, a magnetic field for transfer is applied to one side or both sides thereof by use of a magnetic field generation device constituted of an electromagnet device or permanent magnet device, whereby magnetic transfer of a magnetization pattern corresponding to information (for example, servo signal) included in the master disk is performed.

Regarding such magnetic transfer, various configurations and techniques have hitherto been proposed (for example, Japanese Patent Application Laid-Open No. 2004-87099 and Japanese Patent Application Laid-Open No. 10-40544). Japanese Patent Application Laid-Open No. 2004-87099 has disclosed an invention of an apparatus which holds master disks by use of a pair of holder units and after supplying a slave disk between a pair of the master disks by use of a robot hand, a magnetic field for transfer is applied while the master disks are pressed against both faces of the slave disk and the slave disk is held between the master disks.

Japanese Patent Application Laid-Open No. 10-40544 has disclosed an invention of a technique by which a magnetic field for transfer is applied while a master disk is pressed against a slave disk, the master disk having on the surface of its substrate a configuration of concaves and convexes corresponding to information signal, the surface of at least the convex part being composed of ferromagnetic material.

Magnetic recording media are classified into: in-plane magnetic recording medium that has magnetization easy axis parallel to the plane of its magnetic layer; and perpendicular magnetic recording medium that has magnetization easy axis in a direction perpendicular to the plane of its magnetic layer. In conventional art, due to difficulty of forming perpendicular magnetization films, in-plane magnetic recording media have usually been used.

On the other hand, the development of perpendicular magnetic recording media and perpendicular magnetic recording methods by which a significant improvement in recording density (an increase in storage capacity) can be expected, has progressed and a large scale introduction thereof into the market in the future has been desired.

Consequently, regarding the above described magnetic transfer, also, there has been a need for a configuration compatible with perpendicular magnetic recording. More specifically, the above described development of magnetic transfer technique has been performed, solely focusing on magnetic transfer to in-plane magnetic recording media; but there has been a need for the development of magnetic transfer technique applicable to perpendicular magnetic recording. Against the background of these circumstances, proposals on perpendicular magnetic transfer have also been made.

As the magnetic transfer technique for perpendicular magnetic recording, there have been known the following two techniques.

One of them is a technique that applies a perpendicular oriented magnetic field for transfer to a master disk and slave disk to perform magnetic transfer, the technique being referred to as "bit printing". FIGS. 8, 9A, 9B and 9C are diagrams illustrating this technique. FIG. 8 is a cross-sectional view illustrating a process of applying a magnetic field for transfer in a magnetic transfer apparatus; FIGS. 9A, 9B and 9C are cross-sectional views for explaining a basic step of magnetic transfer.

In the magnetic transfer apparatus, when magnetic transfer is performed, after initializing DC magnetization illustrated in FIG. 9A is performed, the slave face (magnetic recording face) of a slave disk 40 can be brought into contact with the information supporting face of a master disk 46 and closely attached thereto by a given pressing force. Then, as illustrated in FIG. 9B, with the slave disk 40 and master disk 46 being in close contact with each other, a magnetic field for transfer is applied by a magnetic field generation device 70. Accordingly, as illustrated in FIG. 9C, magnetization patterns such as servo signal can be transferred and recorded.

In the master disk 46, as described later with reference to FIG. 4, there are formed convex parts 47A, 47A, . . . of concave and convex pattern on its surface; and a magnetic layer 48 is formed on the convex part 47A of concave and convex pattern.

In a magnetic field generation device 70 for applying magnetic field for transfer, there is arranged an electromagnet device including a core 72, wound with a coil 73, and having a gap 71 in a direction of thickness of the slave disk 40 and master disk 46 held by a contacting device; and thus it is possible to apply a magnetic field for transfer having a magnetic force line G perpendicular to the slave disk 40 and master disk 46.

There is provided a rotation device (not illustrated) by which, during the application of magnetic field, while the slave disk 40 and master disk 46 are integrally rotated, a magnetic field for transfer is applied by use of the magnetic field generation device 70 and thus magnetic transfer of transfer information recorded on the master disk 46 can be performed onto the magnetic recording face of the slave disk 40.

The other technique is one that, after initializing DC magnetization of a slave disk 40 is performed by applying a magnetic field in one direction, applies a magnetic field for transfer of a horizontal direction to a master disk and transfer object disk (slave disk) to perform magnetic transfer, the technique being referred to as "edge printing". FIGS. 1A, 1B, 1C, 2A, 2B and 2C are diagrams for explaining this technique. FIGS. 1A, 1B and 1C are perspective views illustrating a magnetic transfer step; FIGS. 2A, 2B and 2C are cross-sectional views for explaining a basic step of magnetic transfer.

As illustrated in FIG. 1C, in a magnetic field generation device 30 for applying magnetic field for transfer, there is arranged an electromagnet device including a core 32, wound with a coil (not illustrated), and having a gap 31 extending in a radial direction of a slave disk 40 and master disk 46 held by a contacting device; and thus it is possible to generate a magnetic force line G parallel to a track direction to apply a transfer magnetic field. Needless to say, it is possible to use a permanent magnet, instead of the electromagnet.

There is provided a rotation device 36 by which, during applying of magnetic field, while the slave disk 40 and master disk 46 are integrally rotated and made to travel in a direction of the arrow of FIG. 1C relative to a magnetic transfer head 30, a magnetic field for transfer is applied by use of the magnetic transfer head 30 and thus magnetic transfer of transfer information recorded on the master disk 46 can be performed onto the magnetic recording face of the slave disk 40.

FIGS. 2A, 2B, 2C and 2D are as described above, cross-sectional diagrams for explaining a step of magnetic transfer. FIG. 2A illustrates a magnetization state of a magnetic recording layer 40B of the slave disk 40 after unidirectional perpendicular oriented initializing magnetization of the slave disk 40 is performed; FIG. 2B illustrates a step of applying a magnetic field with the master disk 46 and the magnetic recording layer 40B of the slave disk 40 being in close contact with each other; FIG. 2C illustrates a magnetization state of the magnetic recording layer 40B of the slave disk 40 after magnetic transfer; FIG. 2D illustrates a reproduction signal at the time of reproduction of this slave disk 40.

Magnetic transfer is performed as follows. That is, after unidirectional perpendicular magnetization of the magnetic recording layer 40B of the slave disk 40 is as illustrated in FIG. 2A, performed by applying a perpendicular oriented magnetic field as illustrated in FIG. 1A, the face in the magnetic recording layer 40B side of the slave disk 40 is as illustrated in FIG. 1B, brought into close contact with the face in the magnetic layer 48 side of the master disk 46, and thereafter magnetic transfer is performed by use of a leakage flux G produced by applying as illustrated in FIG. 1C, a magnetic field for transfer in a direction parallel to the track face of the slave disk 40.

More specifically, as illustrated in FIG. 2B, when a magnetic field for transfer Hd is applied, leakage flux G corresponding to the configuration pattern of the magnetic layer 48 is generated on the surface of the master disk 46. This leakage flux G contains many components of a direction parallel to the film face of the magnetic layer 48, but has relatively large perpendicular oriented components in the vicinity of both ends of the configuration pattern of the magnetic layer 48. Consequently, a recording magnetization pattern P corresponding to the configuration pattern of the magnetic layer 48 is as illustrated in FIG. 2C, recorded on the magnetic recording layer 40B of the slave disk 40 by the perpendicular oriented component magnetic field of leakage flux G.

Referring to FIG. 2C, while magnetization units magnetically isolated in the perpendicular magnetization film turn upward or downward in a direction such that static energy becomes minimal, magnetization transition area Q seems substantially neutral because each magnetization counteracts each other when viewed macroscopically. Consequently, when reproduction of the slave disk 40 illustrated in FIG. 2C is performed, the reproduction signal has a peak of a vertical direction in the recording magnetization pattern P area as illustrated in FIG. 2D; the reproduction signal turns zero in the magnetization transition area Q. In this way, the magnitude of recording magnetization recorded on the slave disk 40 is large according to the residual magnetization value originally contained in the slave disk 40; the amplitude of reproduction waveform reproduced from such recording magnetization pattern is also as large as that of reproduction signal reproduced from recording magnetization patterns obtained by conventional magnetic head recording.

Also, in the case of perpendicular oriented magnetic field distribution in this configuration, large magnetic field amplitudes of reverse polarity can be obtained in the vicinity of both ends of the magnetic layer 48 pattern. Thus, in this technique, the initializing magnetization process is not indispensable.

SUMMARY OF THE INVENTION

However, the servo signal is usually distorted, so it has been known that the servo correction signal is recorded posterior to the servo signal by use of the magnetic head. However, when the servo signal is recorded by edge printing and the correction signal is recorded by use of the magnetic head, the two signals have different waveforms; thus, the system cannot discriminate one from another properly.

The present invention has been devised to address these circumstances, and has an object of providing: a magnetic transfer method capable of performing satisfactory magnetic transfer to a perpendicular magnetic recording medium; a perpendicular magnetic recording medium by which a servo signal reproduced by a magnetic head can be properly discriminated from a correction signal; and a magnetic recording apparatus having incorporated therein the perpendicular magnetic recording medium.

To achieve the above object, according to a first aspect of the invention, there is provided a manufacturing method for a perpendicular magnetic recording medium including: a magnetic transfer step of applying a magnetic field for transfer parallel to the plane of a disk shaped substrate having formed on the surface thereof a pattern composed of magnetic layer arrangement corresponding to information to be transferred to a perpendicular magnetic recording medium while a master recording medium for perpendicular magnetic transfer being the substrate is brought into close contact with the perpendicular magnetic recording medium, and thereby transferring the magnetic pattern of the master recording medium for perpendicular magnetic transfer to the perpendicular magnetic recording medium; and a servo correction information writing step of writing by use of a magnetic head, a servo correction signal information into a section adjacent to the information transferred to the perpendicular magnetic recording medium by the magnetic transfer step.

According to the present invention, the ordinary servo signal information and servo correction signal information are included as the information to be transferred and written into the slave disk. Accordingly, even when the servo signal is distorted, tracking can be accurately performed by use of this servo correction signal information and thus information recording and reproduction in the perpendicular magnetic recording medium can be performed correctly and at a high speed.

In this case, the servo correction signal information is a servo correction signal indicating a track location on which a servo signal is recorded in case the servo signal has not been recorded on the proper track. For example, it means ZAP Correction (ZeroAccelerationPath) described in U.S. Pat. No. 6,608,731B2.

According to a second aspect of the invention, there is provided a manufacturing method for a perpendicular magnetic recording medium as set forth in the first aspect, wherein the area in which the servo correction signal information is written is a data signal area.

According to a third aspect of the invention, there is provided a manufacturing method for a perpendicular magnetic recording medium as set forth in the first aspect, wherein the area in which the servo correction signal information is written is a servo signal area, and wherein three or more blank bits are arranged between the servo signal information and the servo correction signal information.

According to a fourth aspect of the invention, there is provided a perpendicular magnetic recording medium which is manufactured by the manufacturing method for a perpendicular magnetic recording medium as set forth in any of the first to third aspects.

In the method of recording the correction signal on a servo signal area, three or more blank bits are arranged between the servo signal information and the servo correction signal information. When a predetermined number of or more blank bits are arranged between the servo signal information and servo correction signal information in order to discriminate the servo signal from the servo correction signal, the discrimination therebetween becomes easy. The reason why there are arranged three or more blank bits is to discriminate the servo signal from the servo correction signal recorded on the servo signal area; when two or less bits are arranged, a mix-up with the servo signal occurs and thus the separation is impossible.

When the servo correction signal is recorded on a data area, a predetermined number of or more blank bits does not need to be arranged between the servo signal information and servo correction signal information. Recording is made on a data area, so such discrimination is not needed.

In the present invention, initialization is not always needed, but in order to raise reproducibility, before performing magnetic transfer, initializing magnetization of the magnetic layer of perpendicular magnetic recording medium is preferably performed in one direction parallel to or perpendicular to the substrate plane.

According to a fifth aspect of the invention, there is provided a magnetic recording/reproduction apparatus including a perpendicular magnetic recording medium manufactured by a manufacturing method for a perpendicular magnetic recording medium as set forth in any of the first to third aspects.

According to a sixth aspect of the invention, there is provided the magnetic recording/reproduction apparatus as set forth in the fifth aspect, wherein when the information recorded on the perpendicular magnetic recording medium is reproduced, the servo signal information is subjected to a signal processing without passing through a differentiating circuit, and the servo correction signal information is subjected to a signal processing after passing through a differentiating circuit.

Since the servo signal information has a differentiating waveform, a signal processing can be applied thereto without passing it through a differentiating circuit; but the servo correction signal information has an integral waveform because it is recorded by use of a magnetic head, and thus a signal processing is applied thereto after passing it through a differentiating circuit.

Accordingly, the servo signal is discriminated from the servo correction signal, allowing satisfactory perpendicular magnetic recording and reproduction.

As described above, according to the present invention, the perpendicular magnetic recording medium in which tracking can be accurately performed by use of the servo correction signal information even when the servo signal is distorted, can be manufactured properly at a high speed.

BRIEF DESCRIPTION OF THE DRAWINGS

FIG. 6 is a view illustrating a signal recorded on a slave disk;

DETAILED DESCRIPTION OF THE PREFERRED EMBODIMENTS

Preferred embodiments of a magnetic transfer method, a perpendicular magnetic recording medium using the magnetic transfer method, and a magnetic recording apparatus according to the present invention will be described in detail below with reference to the accompanying drawings.

Figure 3:
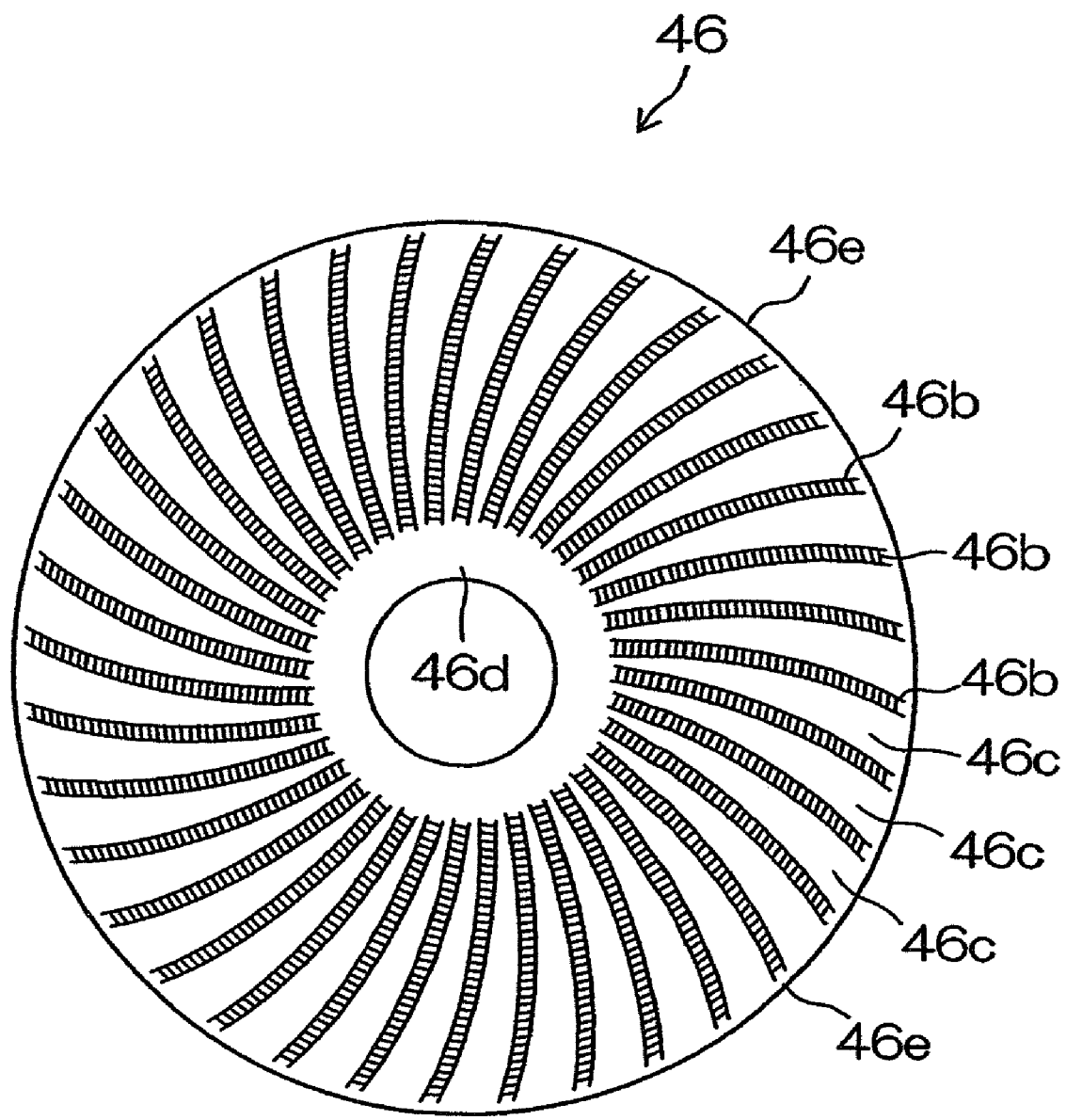
FIG. 3 is a plan view of a master disk for use in perpendicular magnetic transfer.
Figure 4:
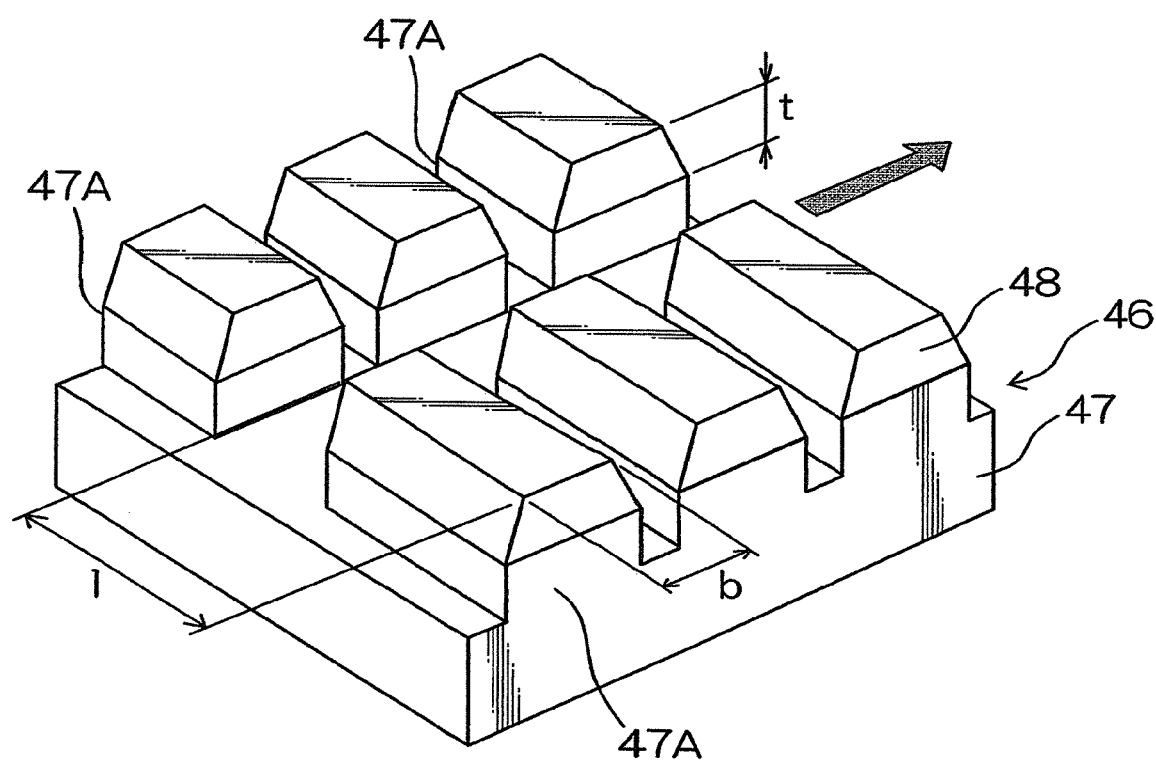
FIG. 4 is an enlarged partial perspective view illustrating a microscopic concave and convex pattern on the surface of the master disk.

FIG. 3 is a plan view of a master disk used in the present invention. FIG. 4 is an enlarged partial perspective view illustrating a microscopic concave and convex pattern on the surface of the master disk 46. It is noted that FIG. 4 is a schematic diagram in which the size of each part is illustrated with a proportion different to the actual one.

As illustrated in FIG. 3, the master disk 46 is formed into a disk shape. In the radial-direction intermediate circumference portion of the master disk 46 (portion obtained by removing an inner circumference portion 46d and outer circumference portion 46e of the master disk 46), there are alternately formed in a circumference direction a servo area 46b and non-servo area 46c (portion with no hatching).

The servo area 46b is an area where a magnetic pattern (servo information pattern) is formed; the non-servo area 46c is an area where no magnetic pattern (servo information pattern) is formed.

This master disk 46 has a shape of circular ring (a shape of doughnut) having a hole in the center, but may have a shape of disk having no hole in the center.

FIG. 4 is an enlarged partial view of the servo area 46b. Formed on one side of a substrate 47 is a transfer information supporting face having formed thereon a microscopic concave and convex pattern made of a magnetic layer 48; the other side of the substrate 47 is held by a contacting device (not illustrated). This microscopic concave and convex pattern is formed by later-described photo fabrication or the like. The one side (transfer information supporting face) of the master disk 46 is the face to be brought into close contact with the slave disk 40.

The microscopic concave and convex pattern is rectangular in a plan view, in which the magnetic layer 48 having a thickness of t is formed. The pattern has a length of b in a track direction (direction of the thick arrow in FIG. 4) and a length of l in a radial direction. The optimal values of lengths b and l vary according to recording density, recording signal waveform and the like; according to the present embodiment, the form is 80 nm in length b and 100 nm in length l.

In the case of the servo signal, this microscopic concave and convex pattern is formed longer in a radial direction. In this case, for example, length l in a cross track direction (radial direction) is preferably 30 to 300 nm, and length b in a down track direction (circumference direction), 20 to 200 nm. It is preferable that a pattern longer in a radial direction is selected as the servo signal pattern from this range.

The depth of concave part of the microscopic concave and convex pattern on the surface of the substrate 47 is preferably in a range from 20 to 300 nm, and more preferably in a range from 30 to 200 nm.

In the master disk 46, when the substrate 47 is made of ferromagnetic composed mainly of Ni or the like, magnetic transfer is possible with this substrate 47 alone and thus the magnetic layer 48 does not need to be coated. However, when the magnetic layer 48 having excellent transfer characteristics is arranged, magnetic transfer can be more satisfactorily performed. When the substrate 47 is a nonmagnetic material, it is needed to arrange the magnetic layer 48. The magnetic layer 48 of the master disk 46 is preferably a soft magnetic layer having a coercivity Hc of 48 kA/m ($\approx$600 Oe) or less.

The substrate 47 of the master disk 46 may be made of nickel, silicon, glasses of various compositions such as silica glass, aluminum, alloyed metal, ceramics of various compositions, synthetic resin or the like. In the case of synthetic resin, there must be used a material which is not transformed in resist peeling liquid used in a liftoff process when photo fabrication is applied, or a configuration (for example, protective coating) which is not transformed in resist peeling liquid.

The concave and convex pattern on the surface of the substrate 47 can be formed by photo fabrication or by stamper method using a master formed by photo fabrication or the like.

In stamper method, a master is formed, for example as follows. That is, a photo resist layer is formed on a glass plate (or silica glass plate) having a smooth surface by spin coating or the like and after prebake, while this glass plate is rotated, laser light (or electron beam) modulated according to a servo signal is irradiated thereto, whereby a given pattern, for example a pattern corresponding to the servo signal and extending from the rotation center in the form of a line in a radial direction is irradiated in parts corresponding to each frame on the circumference in each track throughout substantially the entire surface of the photo resist layer.

Thereafter, the photo resist layer is subjected to a development process, and there is obtained a glass master having a concave and convex pattern formed of the photo resist layer where the irradiated part has been removed. Subsequently, Ni plating (electrocasting) is applied to the face of the photo resist layer on which the concave and convex pattern has been formed, until a given thickness thereof is achieved, whereby a Ni substrate having a positive concave and convex pattern on the surface thereof is formed. Then, this Ni substrate is peeled from the glass master.

This Ni substrate is used directly as a press master, or a press master is produced by coating the concave and convex pattern with a soft magnetic layer, protective film or the like, if necessary.

Also, a reversal master having a negative concave and convex pattern may be produced by applying plating and electrocasting to the glass master to produce a second master and further applying plating and electrocasting to the second master. Further, a substrate having a positive concave and convex pattern may be produced by applying plating and electrocasting to the second master or by pressing the second master with resin of low viscosity and hardening it to produce a third master, and then applying plating and electrocasting to the third master.

The method of forming a master by photo fabrication will now be described. In this method, a photo resist layer is formed on a smooth surface of a plate-shaped substrate by spin coating or the like and after prebake, while this substrate is rotated, laser light (or electron beam) modulated according to a servo signal is irradiated thereto, whereby a given pattern, for example a pattern corresponding to the servo signal and extending from the rotation center in the form of a line in a radial direction is irradiated in parts corresponding to each frame on the circumference in each track throughout substantially the entire surface of the photo resist layer.

Thereafter, the photo resist layer is subjected to a development process, and substrate is obtained having a concave and convex pattern formed of the photo resist layer where the irradiated part has been removed. Post bake is applied to the substrate after the development process, whereby adherence of the photo resist layer to the substrate is increased.

Subsequently, the substrate is etched by an etching step to form holes of a depth corresponding to the concave and convex pattern. Then, the photo resist is removed, and the surface is polished, and when there is burr thereon, this is removed and at the same time the surface is smoothed. As a result, a master having a concave and convex pattern is obtained.

Subsequently, Ni plating (electrocasting) is applied to the face of the master on which the concave and convex pattern has been formed, until a given thickness thereof is achieved, whereby a Ni substrate having a negative concave and convex pattern on the surface thereof is formed. Then, this Ni substrate is peeled from the master.

The material of the Ni substrate and the master by electrocasting may be metal of Ni or Ni alloy. As the method for producing this Ni substrate, various types of film formation techniques can be used such as electroless plating, electrocasting, sputtering or ion plating.

Figure 5A:
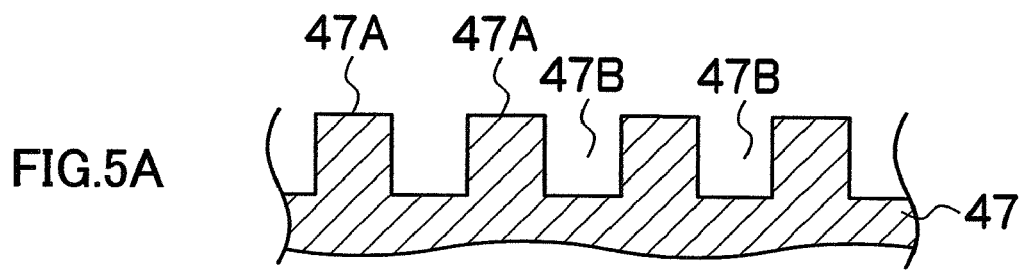
FIGS. 5A, 5B, 5C, 5D and 5E are cross-sectional views of a substrate illustrating a flow of forming a magnetic layer.

The method of forming the magnetic layer 48 will now be described. FIGS. 5A, 5B, 5C, 5D and 5E are cross-sectional views of the substrate 47 illustrating a flow of forming the magnetic layer 48. FIG. 5A illustrates the substrate 47 which has not been processed yet; many microscopic convex parts 47A, 47A . . . of concave and convex pattern, and concave parts 47B, 47B . . . formed between the convex parts 47A and 47A of concave and convex pattern are alternately formed on the surface of the substrate 47 by the above described steps.

Figure 5B:
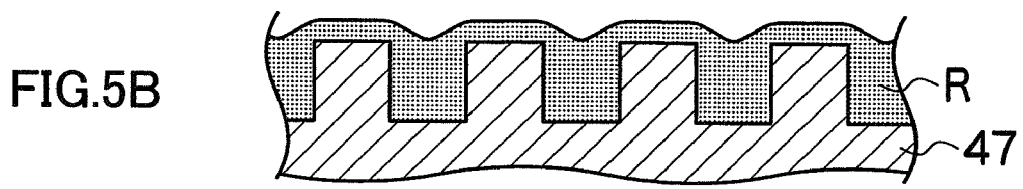

First, as illustrated in FIG. 5B, resist material R is applied to the surface of the substrate 47 to cover the surface of the convex parts 47A, 47A . . . of concave and convex pattern with the resist material R and at the same time fill the concave parts 47B, 47B . . . with the resist material R. As the resist material R, photo resist is typically used, but the resist material R is not limited thereto as long as later-described liftoff is possible, and hence various other materials can be used.

Coating techniques for resist material R include various coating techniques such as spin coat, dye coat, roll coat, dip coat and screen print. With resist material R having a given viscosity or more, when the size of the concave parts 47B, 47B . . . are small, it is occasionally difficult to fill the concave parts 47B, 47B. . . . In this case, the viscosity of resist material R is reduced by diluting it.

Also, a method of coating the surface of the substrate 47 with resist material R under decompression atmosphere (for example, obtained by placing the substrate 47 in a desiccator and then evacuating the interior of the desiccator by use of a vacuum pump or the like) and thereafter releasing it to atmosphere pressure, is also effective in filling the concave parts 47B, 47B . . . of microscopic size with resist material R.

Also, a method of placing the substrate 47 in a desiccator and coating the surface of the substrate 47 with resist material R under atmosphere pressure and thereafter evacuating the interior of the desiccator by use of a vacuum pump or the like, is also effective in filling the concave parts 47B, 47B . . . of microscopic size with resist material R. In this case, bubbles produced in the interior of resist material R of the concave parts 47B, 47B . . . by the evacuation move to the surface of resist material R and then disappear.

Subsequently, the resist material R is hardened in a state illustrated in FIG. 5B. When the resist material R is negative type photo resist (for example, cyclized rubber type), crosslinking polymerization is made to occur by irradiating ultraviolet rays or the like; when the resist material R is positive type photo resist, crosslinking polymerization is made to occur by performing a bake processing (post bake).

Figure 5C:
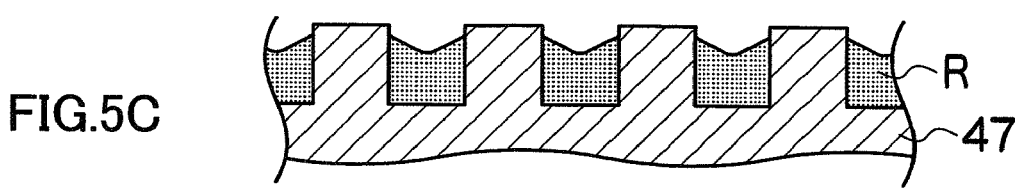

Subsequently, as illustrated in FIG. 5C, the resist material R covering the surface of the convex parts 47A, 47A . . . of concave and convex pattern is entirely removed by ashing. At the same time, part of the resist material R formed in the concave parts 47B, 47B . . . is also removed.

More specifically, the thickness of resist material R covering the surface of the convex parts 47A, 47A . . . of concave and convex pattern is different from that of resist material R put into the concave parts 47B, 47B . . . , so at the time when the resist material R covering the surface of the convex parts 47A, 47A . . . of the concave and convex pattern is entirely removed, the resist material R put into the concave parts 47B, 47B . . . is still present, covering the bottom face of the concave parts 47B, 47B. . . .

Figure 5D:
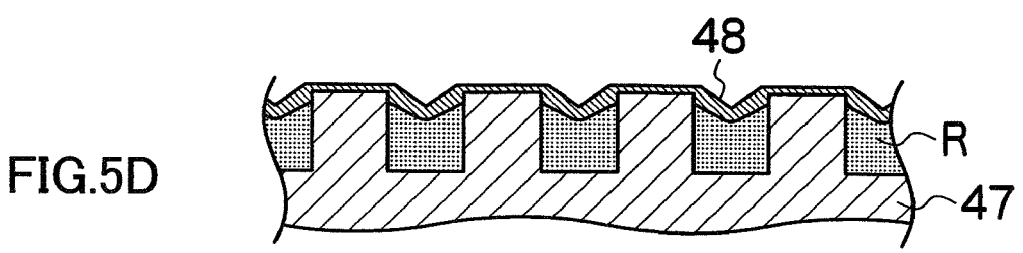

Subsequently, as illustrated in FIG. 5D, a magnetic film is formed on the surface of the substrate 47; the magnetic layer 48 is formed on the surface of the convex parts 47A, 47A . . . of concave and convex pattern where the resist material R has been entirely removed, and on the surface of the resist material R still present in the concave parts 47B, 47B. . . .

The formation of the magnetic layer 48 (soft magnetic layer) is made using a magnetic material by vacuum evaporation coating, sputtering, vacuum film formation method such as ion plating, plating or the like. As the magnetic material of the magnetic layer 48, there can be used Co, Co alloy (CoNi, CoNiZr, CoNbTaZr or the like), Fe, Fe alloy (FeCo, FeCoNi, FeNiMo, FeAlSi, FeAl, FeTaN), Ni, or Ni alloy (NiFe). Particularly, FeCo and FeCoNi are preferably used.

Thickness t of the magnetic layer 48 is preferably in a range from 30 nm to 1000 nm, and more preferably in a range from 50 nm to 500 nm. Also, ratio t/b of thickness t of the magnetic layer 48 to the width (in this case, being length b in a track direction of FIG. 4) of the convex parts of concave and convex pattern is preferably equal to or more than 1. This allows the magnetization direction of the magnetic layer 48 to be maintained perpendicular to the disk face in a stable manner.

Figure 5E:
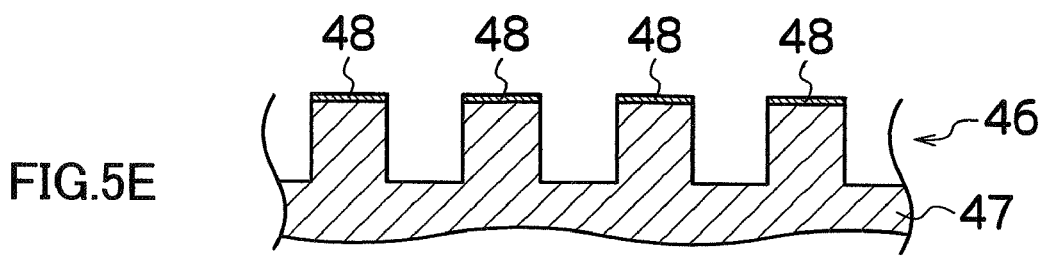

A protective film of diamond-like carbon or the like is preferably arranged on the magnetic layer 48, and a lubricant agent layer may be further arranged on the protective film. In this case, a configuration is preferably used in which as the protective film, there is arranged a diamond-like carbon film of a thickness of 5 to 30 nm and the lubricant agent layer is arranged thereon. Also, the lubricant agent has an effect of improving durability degradation such as scars produced by friction when a dislocation occurring in the contact process with the slave disk 40 is corrected. Further, a contact reinforcement layer of Si or the like may be arranged between the magnetic layer 48 and protective film. Subsequently, the resist material R in the concave parts 47B, 47B . . . is removed. As a result, the magnetic layer 48 on the surface of the resist material R is also removed simultaneously. Consequently, as illustrated in FIG. 5E, there is obtained the master disk 46 for perpendicular magnetic transfer having the magnetic layer 48 formed only on the surface of the convex parts 47A, 47A . . . of concave and convex pattern. That is, there is performed a liftoff process which selectively remove the magnetic layer 48 of the concave parts 47B, 47B. . . .

As a method of removing the resist material R in the concave parts 47B, 47B . . . , when the resist material R is photo resist, specified peeling liquid is used. The peeling liquid passes through pinholes or the like of the magnetic layer 48 and acts on the resist material R, whereby the resist material R is removed. Also, in order to boost the operation of peeling liquid, ultrasonic vibration may be applied or the peeling liquid may be heated.

Figure 1A:
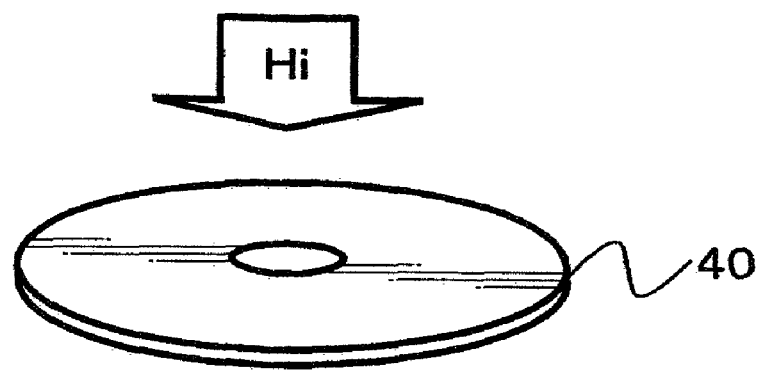
FIGS. 1A, 1B and 1C are perspective views illustrating a magnetic transfer step in a magnetic transfer method of the present invention.
Figure 1B:
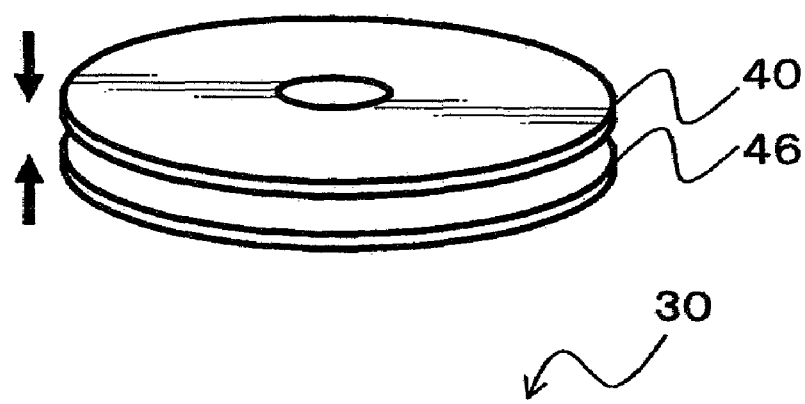
Figure 1C:
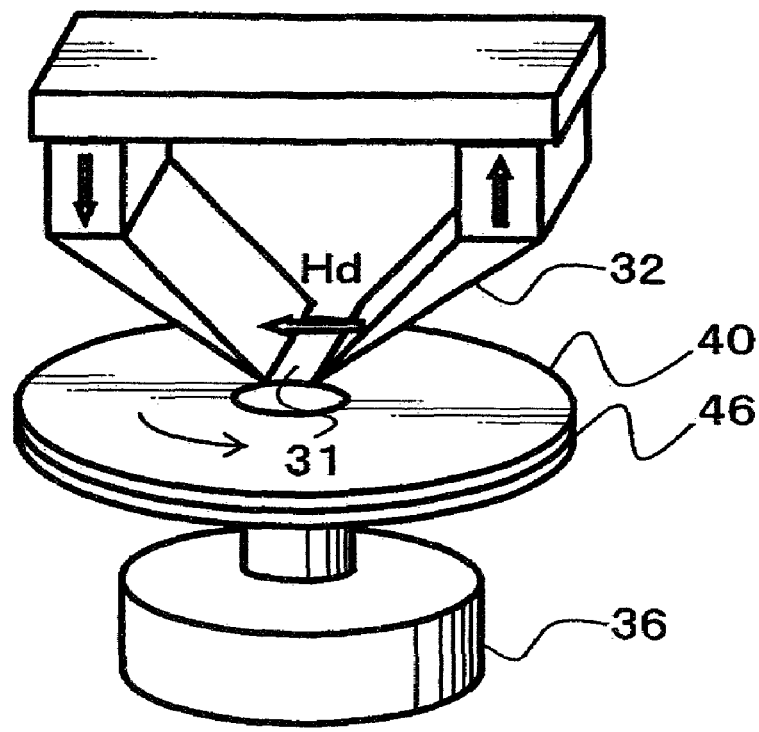
Figure 2A:
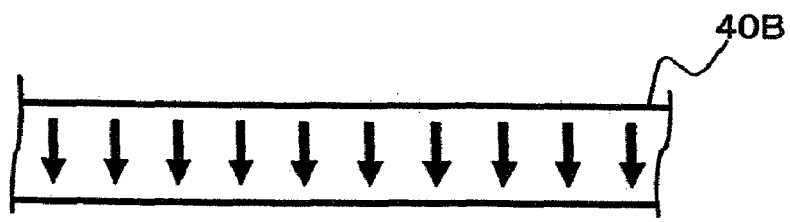
FIGS. 2A, 2B, 2C and 2D are cross-sectional views for explaining a basic step of magnetic transfer.
Figure 2B:
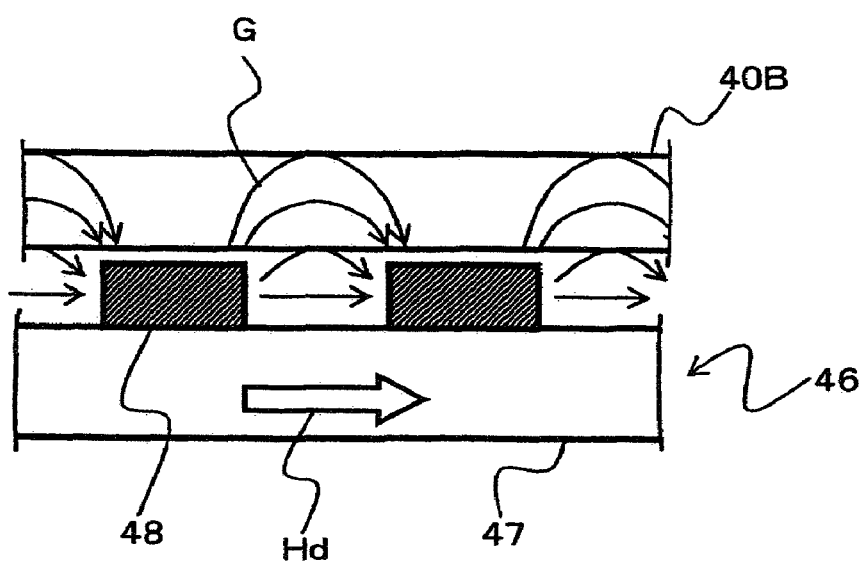
Figure 2C:
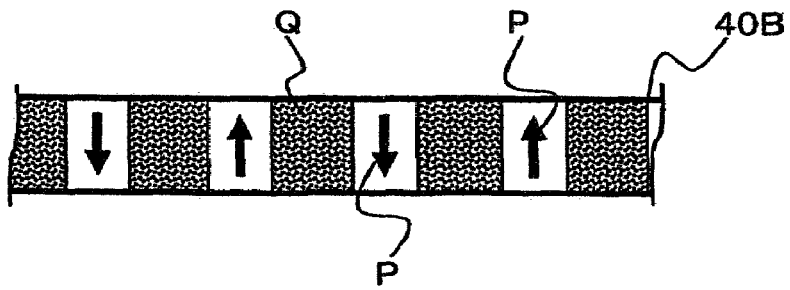
Figure 2D:
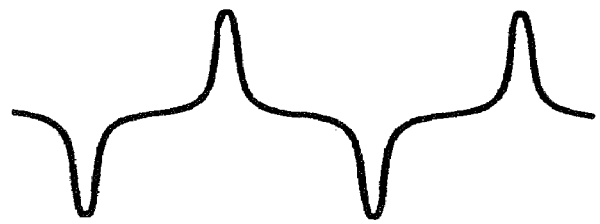

The magnetic transfer method of transferring the magnetic layer pattern of the master disk 46 to the slave disk 40 being the transfer object disk will now be described. FIGS. 1A, 1B and 1C described above is a substantial front view of a magnetic transfer apparatus 10 for implementing magnetic transfer by use of the master disk 46 according to the present invention. FIGS. 2A, 2B and 2C are cross-sectional views for explaining a basic step of magnetic transfer.

The slave disk 40 will now be described. The slave disk 40 is a disk-like magnetic recording medium such as a hard disk or flexible disk having a magnetic recording layer formed on both faces or one face thereof Before being brought into close contact with the master disk 46, there is performed, if necessary, a cleaning processing (banishing or the like) for removing microscopic protrusions or attached dust on the surface by use of a grind head, abrading agent or the like. Also, initializing magnetization is preliminarily applied to the slave disk 40. Details thereof will be described later.

The slave disk 40 may be a disk-shaped magnetic recording medium such as a hard disk or high-density flexible disk. The magnetic recording layer of the slave disk 40 may be coating type magnetic recording layer, plating type magnetic recording layer, or metal film type magnetic recording layer.

The magnetic material for metal film type magnetic recording layer may be Co, Co alloy (CoPtCr, CoCr, CoPtCrTa, CoPtCrNbTa, CoCrB, CoNi or the like), Fe, and Fe alloy (FeCo, FePt, FeCoNi). These are preferable because they have large magnetic flux density and magnetic anisotropy of a direction (perpendicular direction in the case of perpendicular magnetic recording) identical to magnetic field applying direction, thus allowing clear transfer. Further preferably, for example, oxide of oxygen, $SiO_2$ or the like, such as CoPtCr—O or CoPtCr—$SiO_2$ is contained.

A nonmagnetic underlying layer is preferably arranged in the lower layer (support side) of the magnetic recording layer to give required magnetic anisotropy. As the underlying layer, in order to achieve matching between crystal structure and lattice constant of the magnetic recording layer, there are preferably used Ru, Ti, Cr, CrTi, CoCr, CrTa, CrMo, NiAl, Pd or the like.

Further, in order to stabilize the perpendicular magnetization state of the magnetic recording layer and also improve the sensitivity during recording and reproduction, a backing layer made of a soft magnetic material is further preferably arranged under the nonmagnetic underlying layer.

The thickness of the magnetic recording layer is preferably 10 nm to 500 nm, and more preferably 20 nm to 200 nm. Also, the thickness of the nonmagnetic underlying layer is preferably 10 nm to 150 nm, and more preferably 20 nm to 80 nm. Also, the thickness of the backing layer is preferably 50 nm to 2000 nm, and more preferably 80 nm to 400 nm.

Magnetic transfer by the master disk 46 is as illustrated in FIGS. 1A, 1B and 1C described above, classified into two cases: (1) the master disk 46 is brought into close contact with one side of the slave disk 40 to perform magnetic transfer on one face; (2) the master disks 46 and 46 are brought into close contact with both faces of the slave disk 40, respectively, to simultaneously perform magnetic transfer onto both faces.

When magnetic field is applied, as described above, while the slave disk 40 and master disk 46 are integrally rotated, i.e., are made to move in a direction of the thick arrow of FIGS. 1A, 1B and 1C relative to the magnetic transfer head 30, magnetic field for transfer is applied by use of the magnetic transfer head 30 to perform magnetic transfer recording of transfer information of the master disk 46 onto the slave face of the slave disk 40. However, in addition to the configuration of FIGS. 1A, 1B and 1C, there can also be used a configuration in which the magnetic transfer head 30 being the magnetic field generation device is made to move and rotate.

Consequently, as illustrated in FIG. 2B, information (for example, servo signal) corresponding to convex parts 47A, 47A . . . (refer to FIG. 2A) of concave and convex pattern of the master disk 46 is magnetically transferred and recorded on the magnetic recording layer 40B of the slave disk 40.

As described above, according to the present embodiment, perpendicular oriented magnetic field distribution having reverse polarity in the vicinity of both ends of the magnetic layer 48 pattern and at the same time having large magnetic field amplitude, can be obtained by use of applied magnetic field for transfer. Accordingly, after an initializing magnetization process by DC erasing or the like is performed, initial magnetization is prevented from being left in the magnetic recording layer 40B of the slave disk 40; and the magnetization pattern in which magnetization areas having reverse polarity are alternately arrayed between magnetization transition areas Q, Q . . . , can be recorded.

Accordingly, larger reproduction signal amplitude can be obtained. That is, according to the present embodiment, DC erasing is not always needed.

There will now be described the servo correction information writing step of writing by use of a magnetic head a servo correction signal information into a section adjacent to the information transferred to the slave disk 40 by the magnetic transfer step. The writing of servo correction information is conducted by performing magnetic recording onto the slave disk 40 while the magnetic head is made to float at a given flying height. This recording method is ordinary one, and hence an explanation thereof is omitted.

FIG. 6 illustrates a signal recorded on the slave disk by the above step. In FIG. 6, center line T indicates a track direction (circumference direction). This slave disk 40 is in a state where the magnetic transfer step and servo correction information writing step have been performed, but data information has not been written in the data area.

In FIG. 6, period T10A indicates a transferred signal corresponding to one pitch of the servo area 46b (servo wedge) of the master disk 46 of FIG. 3; period T10B indicates a signal (no signal) of one pitch corresponding to the non-servo area 46c (i.e., data writing area) of the master disk 46 of FIG. 3.

Period T10C arranged between the rear end of period T10A and the front end of period T10B indicates an area in which servo correction signal information is to be written. In this period T10C, period TS being three or more blank bits is arranged between the servo signal information and servo correction signal information.

When viewed from the head (the left side of FIG. 6), the signal corresponding to one pitch in period T10A (corresponding to the servo area 46b of FIG. 3) consists of the first preamble 50, servo timing mark 52, sector address 54, cylinder address 56, burst signal 58 of a predetermined period (composed of four signals 58A, 58B, 58C and 58D), and the last preamble 60. This is the format of the servo area 46b typically used in magnetic recording.

Figure 7:
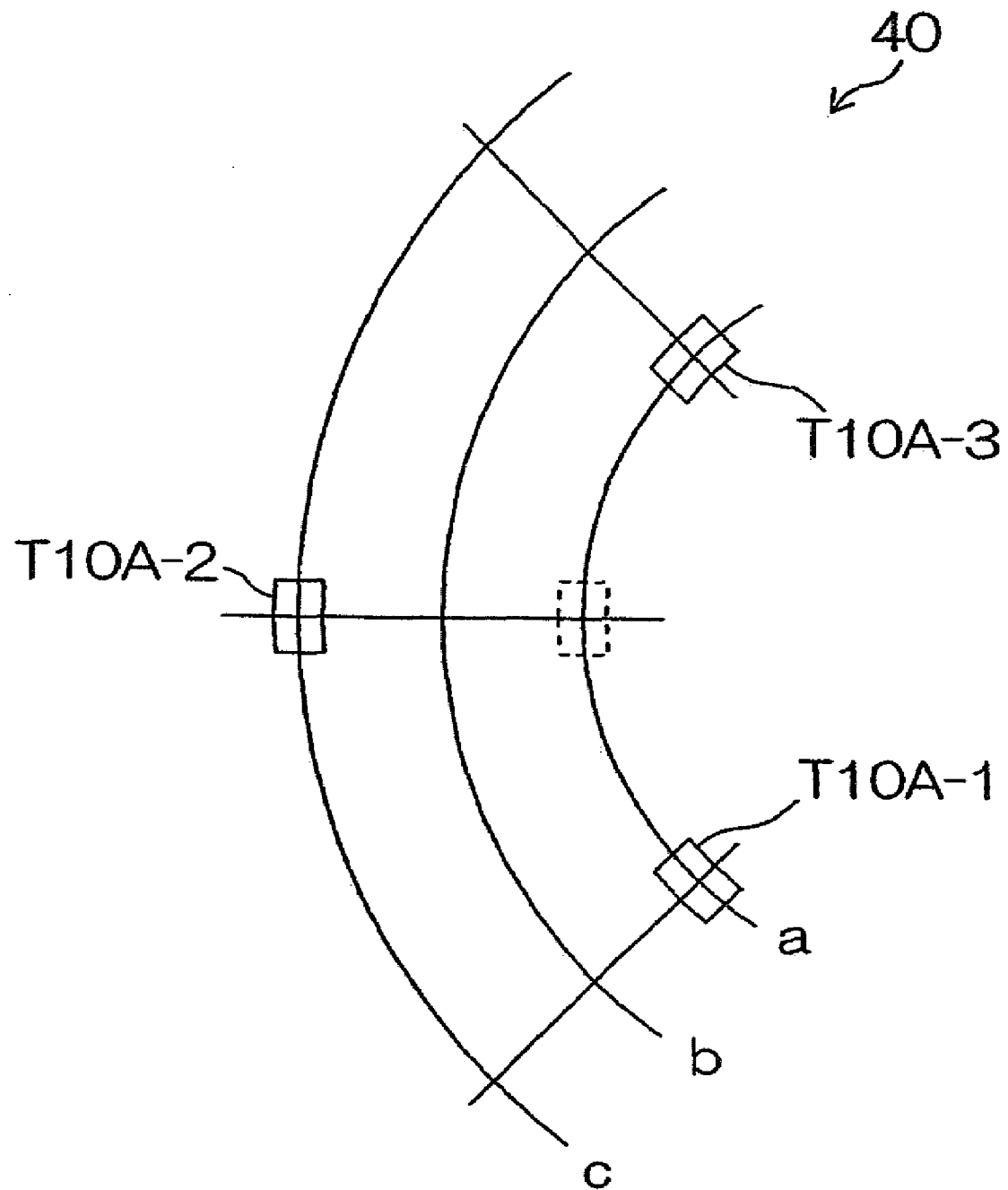
FIG. 7 is a schematic view illustrating an example of servo correction signal information.
Figure 8:
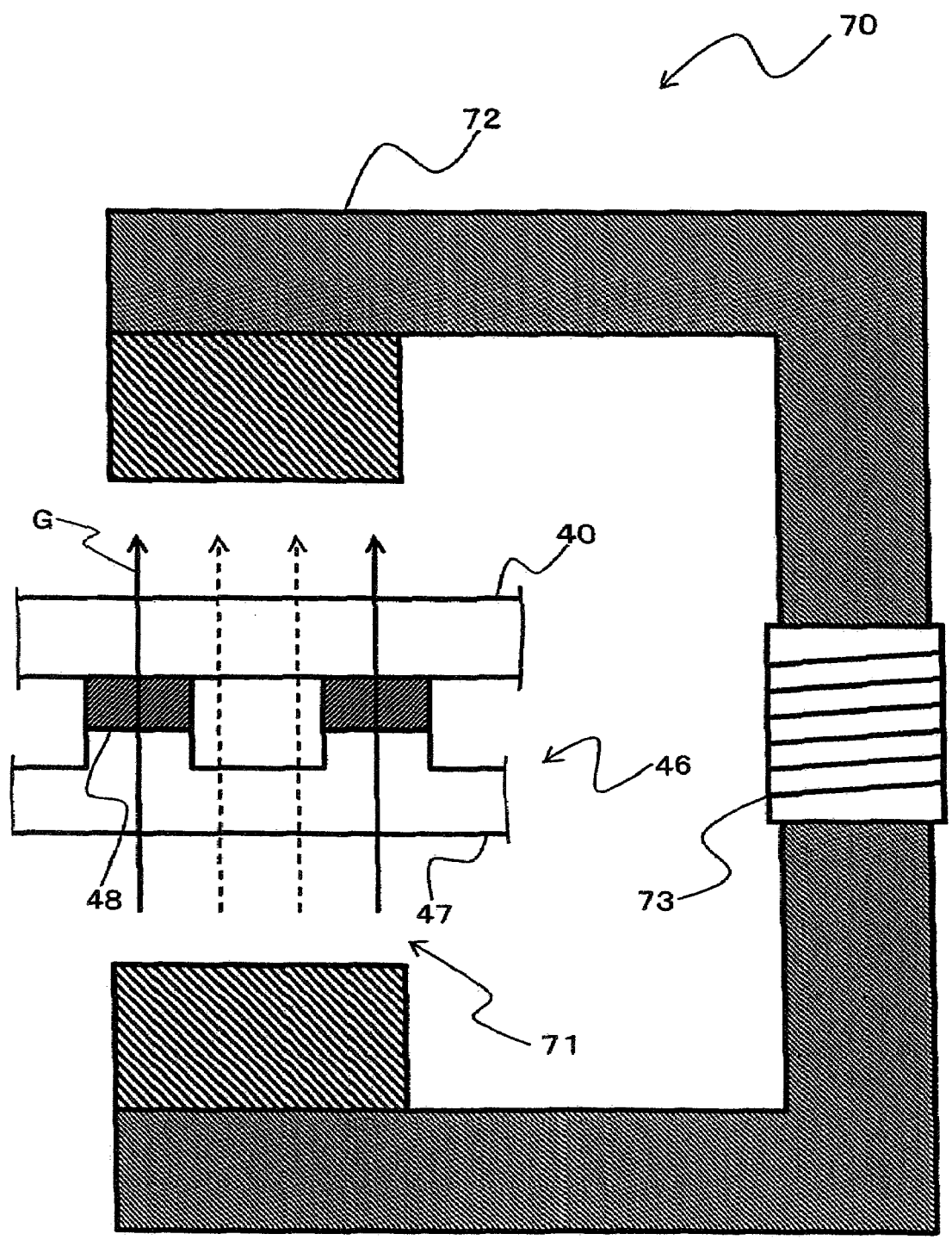
FIG. 8 is a cross-sectional view of a magnetic transfer apparatus used in another magnetic transfer method.
Figure 9A:
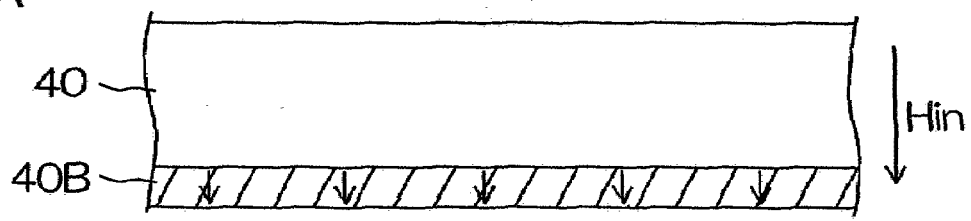
FIGS. 9A, 9B and 9C are cross-sectional views for explaining a basic step of another magnetic transfer.
Figure 9B:
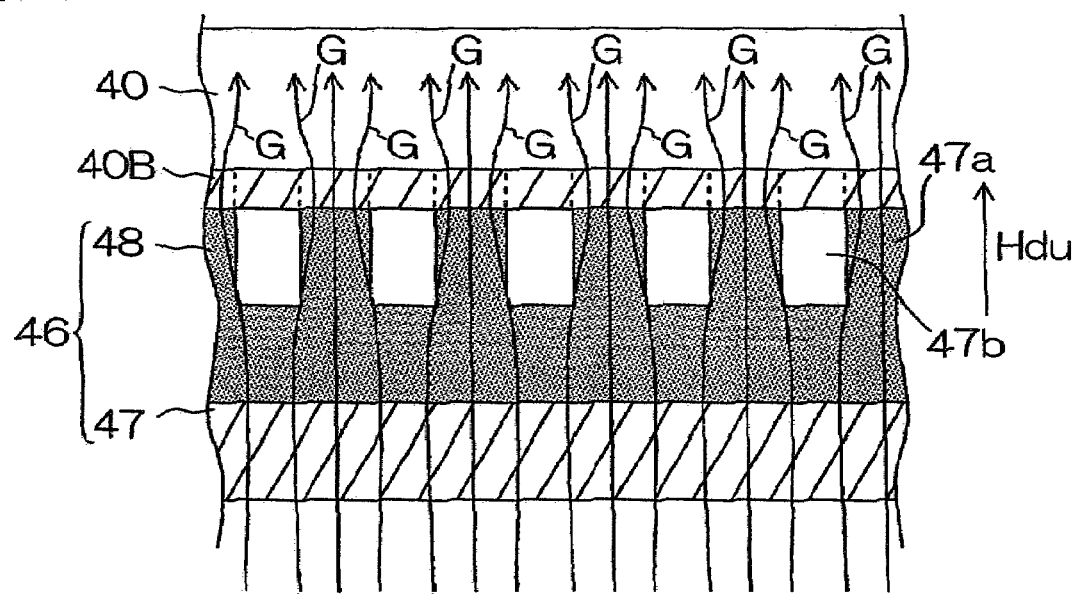
Figure 9C:
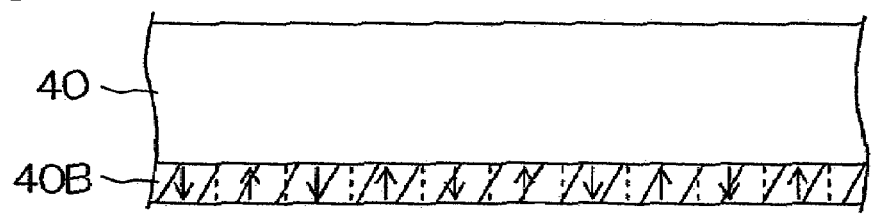

The servo correction signal information 62 (period T10C) according to the present invention will now be described. Servo correction signal is a signal indicating dislocation both in a down track direction and cross track direction from the original servo position; the reproduction head performs servo tracking based on the servo correction signal. FIG. 7 is a schematic diagram when dislocation is significantly large in a cross track direction.

In FIG. 7, reference characters a, b, c . . . denote each track of the slave disk 40. Assume that the magnetic head (read head, not illustrated) is currently present on the track a.

When magnetic transfer is properly performed, a one-pitch signal corresponding to the servo area 46b of FIG. 3 is recorded on the track a in order of T10A-1, T10A-2, T10A-3 . . . . However, as illustrated in FIG. 7, when a large dislocation from the original position occurs and, for example, recording is performed onto the track c positioned two tracks outward, the magnetic head cannot perform tracking and thus a read error occurs.

The servo correction signal information 62 of the present invention serves to cope with such case; the information 62 is correction signal information for performing control such that, when the magnetic head is present on the track a, an attempt to read signal T10A-2 is not made, and the magnetic head is moved onto the track c, one circumference early to read signal T10A-2.

As described above, according to the present invention, the information to be transferred and written into the slave disk 40 includes the servo signal information (T10A of FIG. 6) and the servo correction signal information (T10C of FIG. 6) having an integral waveform, so even when the servo signal is distorted, tracking can be accurately performed by use of this servo correction signal information and thus magnetic transfer in perpendicular magnetic recording can be performed correctly and at a high speed.

The ordinary servo signal information (T10A of FIG. 6) has a waveform similar to a differentiating waveform transferred by edge printing; the servo correction signal information (T10C of FIG. 6) has an integral waveform recorded by use of the magnetic head.

The servo signal information is subjected to a signal processing without passing through a differentiating circuit, and the servo correction signal is subjected to a signal processing after passing through a differentiating circuit, whereby it is possible to discriminate the servo signal information from the servo correction signal information and read them. Since the servo correction signal information is recorded by a system different from that of the servo signal, even when the servo signal is distorted, the servo correction signal information can be correctly reproduced, thus allowing accurate tracking.

The slave disk 40 produced in this manner can be incorporated and used in a magnetic recording apparatus such as a hard disk drive; in this magnetic recording apparatus, there is incorporated a function of applying as described above, a signal processing to the servo signal information without passing the servo signal information through a differentiating circuit and of applying a signal processing to the servo correction signal information after passing the servo correction signal information through a differentiating circuit.

The magnetic transfer method for a perpendicular magnetic recording medium, the perpendicular magnetic recording medium, and the magnetic recording apparatus according to the present invention have been described above, but the present invention is not limited to the present embodiment and various other embodiments are possible.

Also, in the master disk 46, as illustrated in FIG. 4, a pattern composed of the magnetic layer 48 is formed on a concave and convex pattern in one side of the substrate 47 being a nonmagnetic base; but instead of this, a configuration can also be used in which a concave and convex pattern composed of the magnetic layer 48 is formed on one side of a flat substrate being a nonmagnetic base.

Similarly, the configuration of the master disk 46, instead of the configuration of FIG. 4 may be a configuration in which a pattern composed of ferromagnetic film is embedded and arrayed in the surface layer of a flat substrate made of a nonmagnetic material, the surface of the master disk 46 being flat with no concave and convex thereon.

Further, referring to FIG. 4, the planar parts of the magnetic layer 48 are all rectangular in shape, but not limited thereto practically; various other shapes can be used according to applications.

Also, according to the present invention, in the magnetic transfer head 30 being a magnetic field generation device, the electromagnet device 34 is placed in the lower side of the slave disk 40 and master disk 46. Instead of this, however, there can also be used a configuration in which two magnet devices (rod magnet) are placed with a spacing therebetween in the lower side of the master disk 46 to apply a magnetic field. Further, the magnet device may be any of an electromagnet or permanent magnet.

What is claimed is:

1. A magnetic transfer method comprising:
    a magnetic transfer step of applying a magnetic field for transfer parallel to the plane of a disk shaped substrate having formed on the surface thereof a pattern composed of magnetic layer arrangement corresponding to information to be transferred to a perpendicular magnetic recording medium while a master recording medium for perpendicular magnetic transfer being the substrate is brought into close contact with the perpendicular magnetic recording medium, and thereby transferring the magnetic pattern of the master recording medium for perpendicular magnetic transfer to the perpendicular magnetic recording medium; and
    a servo correction information writing step of writing by use of a magnetic head, a servo correction signal information into a section adjacent to the information transferred to the perpendicular magnetic recording medium by the magnetic transfer step.

2. The magnetic transfer method according to claim 1, wherein
    the adjacent section is a servo signal area.

3. The magnetic transfer method according to claim 1, wherein
    the adjacent section is a data signal area.

4. The magnetic transfer method according to claim 1, wherein
    three or more blank bits are arranged between the servo signal information and the servo correction signal information.

5. A perpendicular magnetic recording medium, wherein
    a magnetic transfer of the perpendicular magnetic recording medium is performed by the magnetic transfer method according to claim 1.

6. A perpendicular magnetic recording medium, wherein
    a magnetic transfer of the perpendicular magnetic recording medium is performed by the magnetic transfer method according to claim 2.

7. A perpendicular magnetic recording medium, wherein
    a magnetic transfer of the perpendicular magnetic recording medium is performed by the magnetic transfer method according to claim 3.

8. A perpendicular magnetic recording medium, wherein
    a magnetic transfer of the perpendicular magnetic recording medium is performed by the magnetic transfer method according to claim 4.

9. A magnetic recording apparatus comprising a perpendicular magnetic recording medium according to claim 5.

10. A magnetic recording apparatus comprising a perpendicular magnetic recording medium according to claim 6.

11. A magnetic recording apparatus comprising a perpendicular magnetic recording medium according to claim 7.

12. A magnetic recording apparatus comprising a perpendicular magnetic recording medium according to claim 8.

* * * * *